(12) United States Patent
Boskovic

(10) Patent No.: US 8,473,542 B2
(45) Date of Patent: Jun. 25, 2013

(54) INTERACTION BETWEEN BUSINESS SYSTEM AND MOBILE DEVICE

(75) Inventor: Srdjan Boskovic, Heidelberg (DE)

(73) Assignee: SAP AG, Walldorf (DE)

( * ) Notice: Subject to any disclaimer, the term of this patent is extended or adjusted under 35 U.S.C. 154(b) by 643 days.

(21) Appl. No.: 12/346,455

(22) Filed: Dec. 30, 2008

(65) Prior Publication Data

US 2010/0169787 A1 Jul. 1, 2010

(51) Int. Cl.
*G06F 15/173* (2006.01)
(52) U.S. Cl.
USPC ........................................................ 709/202
(58) Field of Classification Search
USPC ................... 709/201, 202, 203, 217, 219, 227
See application file for complete search history.

(56) References Cited

U.S. PATENT DOCUMENTS

| 2002/0073240 | A1* | 6/2002 | Kokkinen et al. | 709/249 |
| 2002/0092903 | A1* | 7/2002 | Matsumoto | 235/375 |
| 2005/0094666 | A1* | 5/2005 | Biyens et al. | 370/473 |
| 2005/0097186 | A1* | 5/2005 | Redpath | 709/217 |
| 2008/0195698 | A1* | 8/2008 | Stefanovic et al. | 709/203 |

OTHER PUBLICATIONS

'Middleware' [online] Wikipedia, 2007, [retrieved on Jul. 2, 2009]. Retrieved from the Internet: <URL: http://web.archive.org/web/20071014232346/http://en.wikipedia.org/wild/Middleware>, 3 pages.
'ITSmobile' [online] SAP, [retrieved on Dec. 2, 2008]. Retrieved from the Internet: <URL: http://help.sap.com/saphelp_nw04/helpdata/en/48/b2c66fflf33b8be10000000a421937/cont.>, 2 pages.
'What is HTMLB?' [online] SAP, [retrieved on Dec. 3, 2008]. Retrieved from the Internet: <URL: http://help.sap.com/saphelp_nw2004s/helpdata/de/08/80f34027ef8d38e1000000a155106/.>, 2 pages.
'ITSmobile Services' [online]. SAP, [retrieved on Dec. 2, 2008]. Retrieved from the Internet: <URL: http://help.sap.com/saphelp_nw04/helpdata/en/46/6c394e41496a58e10000000a11466f/con>, 1 page.

* cited by examiner

*Primary Examiner* — Scott Christensen
(74) *Attorney, Agent, or Firm* — Fish & Richardson P.C.

(57) ABSTRACT

A computer program product tangibly embodied in a computer-readable storage medium includes instructions that when executed by a processor perform a method for interaction between a business system and a mobile device. The method includes forwarding, from a business system that includes an application program having logical functionality, a visual interface for storage on a mobile device and display by a browser on the mobile device, the visual interface configured for making a call from the mobile device to the logical functionality. The method includes storing a business system proxy on a computer device configured for communication with the mobile device at a remote location, the business system proxy including the logical functionality and configured to receive the call from the mobile device. The method includes receiving, in the business system, an update from the business system proxy relating to use of the mobile device at the remote location.

18 Claims, 3 Drawing Sheets

INTERACTION BETWEEN BUSINESS SYSTEM AND MOBILE DEVICE

TECHNICAL FIELD

This document relates to interaction between a business system and a mobile device using a business system proxy.

BACKGROUND

Some business applications are designed to receive and process input relating to matters at various physical locations. For example, in the area of supply chain management (SCM), manufacturing, storage and/or transportation of products can be managed using a business system. For example, users at various positions in the supply chain can forward data relating to some aspect of the SCM and this information can be gathered by the business system and used for one or more purposes, such as to confirm that a product will be ready or delivered on time, or to make alternative arrangements when a delay occurs or is expected.

Mobile devices exist that can communicate with central computer systems over wide areas using any of multiple available wireless forms of communication. Typically, a client application for the mobile device will be developed to interact with a business system, either directly or via middleware. If the business system requires complex and sophisticated functionality by the mobile device, the client application may need to be very extensive and can occupy significant memory space on the mobile device. Moreover, to use more than one type or platform of mobile device the business may need to develop the client application separately for each type/platform. Replication and synchronization between business system and mobile devices typically require 3-tier architecture with complex middleware between the device and a business system.

SUMMARY

The invention relates to interaction between business system and mobile device.

In a first aspect, a computer program product is tangibly embodied in a computer-readable storage medium and includes instructions that when executed by a processor perform a method for interaction between a business system and a mobile device. The method includes forwarding, from a business system that includes an application program having logical functionality, a visual interface for storage on a mobile device and display by a browser on the mobile device, the visual interface configured for making a call from the mobile device to the logical functionality. The method includes storing a business system proxy on a computer device configured for communication with the mobile device at a remote location, the business system proxy including the logical functionality and configured to receive the call from the mobile device. The method includes receiving, in the business system, an update from the business system proxy relating to use of the mobile device at the remote location.

Implementations can include any or all of the following features. The method can further include performing a replication or synchronization of the business system proxy with the business system before the business system proxy and the mobile device engage in the communication, wherein the mobile device uses the replication or synchronization in the communication with the business system proxy. Storing the business system proxy can include at least one selected from: installing the business system except at least one reduced component on the computer device; and copying the business system to the computer device. The business system proxy can appear identical to the business system relative to the mobile device. The computer device can be located in a vehicle transporting an operator of the mobile device to the remote location, and the computer device can engage in local wireless communication with the mobile device during use of the mobile device at the remote location. The visual interface can be generated so that the communication with the logical functionality is required for the visual interface to operate. The method can further include generating the visual interface in the business system from the application program, the visual interface generated using markup language code. The visual interface can be configured so that the mobile visual generates the call to the business system proxy by executing script code in the visual interface. The visual interface can be configured so that the mobile device can migrate into direct communication with the business system other than using the business system proxy as permitted by communication conditions.

In a second aspect, a computer program product is tangibly embodied in a computer-readable storage medium and includes instructions that when executed by a processor perform a method for interaction between a business system and a mobile device. The method includes receiving, on a mobile device, a visual interface for storing on the mobile device and display by a browser, the visual interface received from a business system that includes an application program having logical functionality, the visual interface configured for making a call from the mobile device to the logical functionality. The method includes establishing a communication with a business system proxy using the mobile device, the business system proxy including the logical functionality and being stored on a computer device configured for communicating with the mobile device at a remote location. The method includes generating the call from the mobile device to the business system proxy using the logical functionality, the call relating to use of the mobile device at the remote location and the business system proxy being configured to forward an update to the business system based on the call.

Implementations can include any or all of the following features. The computer device can be located in a vehicle transporting an operator of the mobile device to the remote location, and the computer device can engage in local wireless communication with the mobile device during use of the mobile device at the remote location. The visual interface can be generated so that the communication with the logical functionality is required for the visual interface to operate. The visual interface can be generated in the business system from the application program using markup language code. Generating the call can include executing script code in the visual interface. The method can further include migrating the mobile device into direct communication with the business system other than using the business system proxy as permitted by communication conditions. The method can further include verifying, before migrating, with the business system proxy that the update has been forwarded.

In a third aspect, a system includes a mobile device having stored therein a visual interface for display by a browser, the visual interface configured for making a call from the mobile device to logical functionality of a business system. The system includes a business system proxy stored on a computer device configured for communicating with the mobile device at a remote location, the business system proxy including the logical functionality and configured to receive the call from the mobile device, and forward an update to the business system based on the call.

Implementations can include any or all of the following features. The business system proxy can be stored on the computer device using at least one selected from: installing the business system except at least one reduced component on the computer device; and copying the business system to the computer device. The business system proxy can appear identical to the business system relative to the mobile device. The computer device can be located in a vehicle transporting an operator of the mobile device to the remote location, and the computer device can engage in local wireless communication with the mobile device during use of the mobile device at the remote location.

Implementations can provide any or all of the following advantages. A business system proxy can allow a mobile device to work with screens that require continuous availability of logical functionality from the business system, also when the mobile device does not connect with the business system. Use of a browser on a mobile device according to some implementations can reduce or eliminate need to develop an application specific to an individual type or operating system. Dependency on individual vendors of mobile devices, operating systems or applications can be reduced or eliminated in some implementations. A browser instead of application on the mobile device in some implementations can reduce costs for device and application maintenance. Business logic can be centrally located in the system landscape yet be used in device operations at remote locations according to some implementations. A mobile device according to some implementations can smoothly migrate to direct communication with a business system based on network availability. Risk of data loss due to malfunction or loss of mobile device in the field can be reduced in some implementations.

The details of one or more embodiments are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Figure 1:
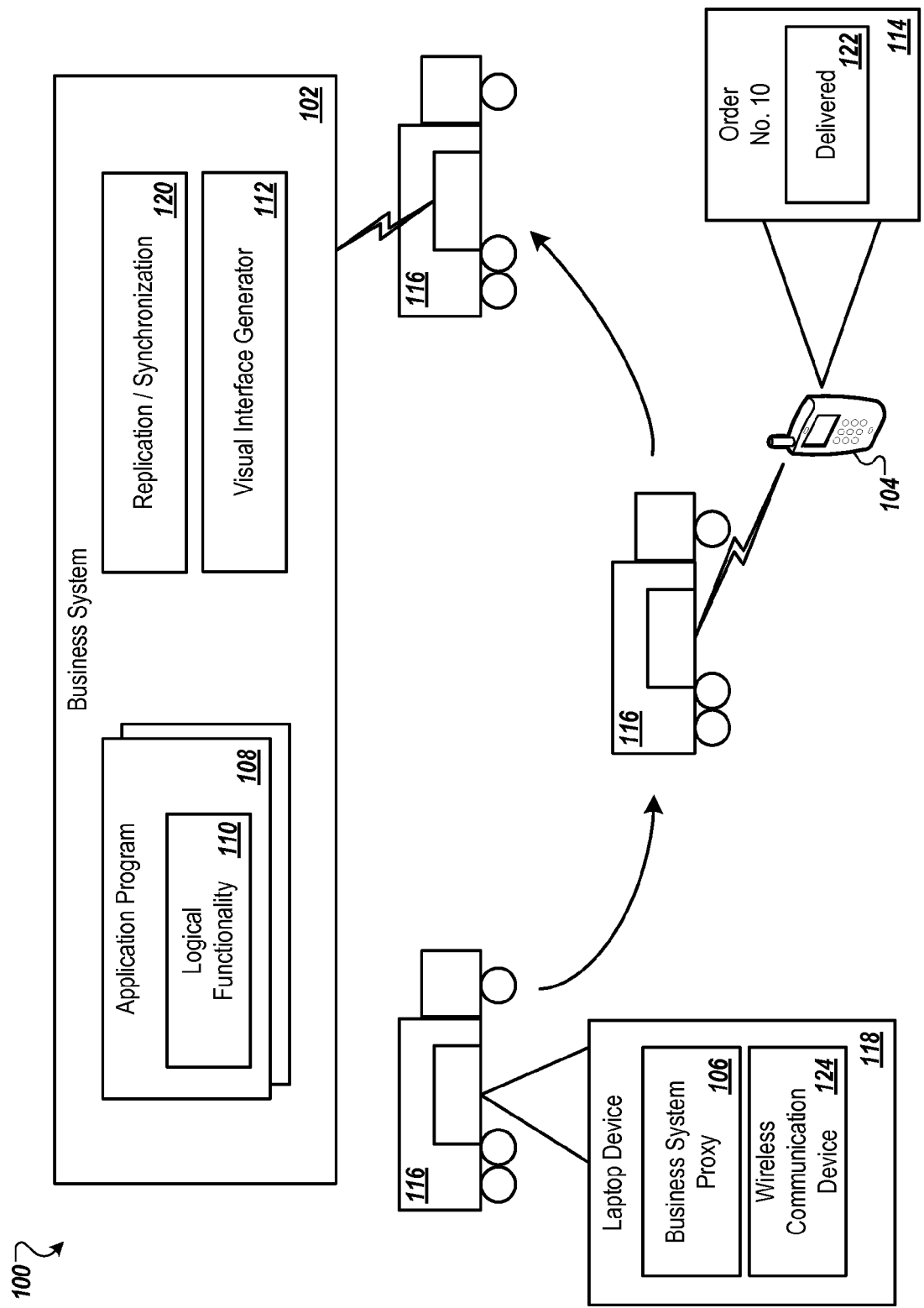
FIG. 1 shows an example of a system where a business system and a mobile device can interact using a business system proxy.

FIG. 1 shows an example of a system 100 where a business system 102 and a mobile device 104 can interact using a business system proxy 106. The business system 102 can include any type of computer device, such as a server device configured for use in enterprise resource planning (ERP). In some implementations, the ERP functionality can include multiple areas focusing on respective aspects, such as customer relationship management (CRM) or supply chain management (SCM). For example, SCM functionality can manage how products are manufactured and transported from a supplier to a vendor in one or more stages. Here, the business system 102 includes one or more application programs 108, for example directed to an aspect of ERP such as SCM. For example, the application program 108 can be configured to operate based on business functionality, such as rules and/or other executable instructions that govern how SCM is performed. The business logic in the application program 108 is here schematically illustrated as logical functionality 110, which can include one or more executable code portions included in the application program 108.

The business system 102 can be configured to provide for mobile interaction between a device and the application program 108. In some implementations, the business system can include a visual interface generator 112 that can generate a visual interface 114 that can be used by the mobile device 104 and other devices. For example, the generator 112 can process one or more screens from the application program 108 and generate the corresponding visual interface 114. In some implementations, the screens of the program 108 may have been defined in a markup language such as HTML and the visual interface 114 can be generated using markup language code. For example, the visual interface 114 can be generated to use web controls implemented using Java code, such as in HTML-Business for Java (HTMLB). That is, the generator 112 can process the screen(s) from the program 108 to ensure that the visual interface 114 can interact with the logical functionality 110, without requiring any business logic to be stored on the mobile device 104. Rather, the visual interface 114 can be configured to make one or more calls to the application program 108, such as by directly addressing at least a portion of the logical functionality 110, for performing a particular operation, for example, an SCM-related reporting operation.

In operation, the business system 102 can depend on gathering information from one or more geographic locations. For example, SCM can be based on tracking progress and status at one or more remote locations, and analyzing this information to gain insight into the logical flow relating to product manufacturing or transportation. In some implementations, a vehicle such as a truck 116 can be used to transport an operator to a remote location to perform a task, for example to deliver an ordered product and/or verify that a product is delivered at the location. The truck 116 can be provided with any type of computer device, such as a laptop device 118. The laptop device 118 can be operated by the user of the truck for one or more purposes, such as to perform remote operations relating to the business system 102, as will be described.

The business system proxy 106 can be stored on the laptop device 118. In operation, the proxy 106 can act as a local proxy for the business system 102, or at least a part thereof relevant to the ERP operations in the field. For example, the proxy 106 can exhibit the logical functionality 110 and thereby ensure that the visual interface 114 is operable. Particularly, the mobile device 104 can engage in local communication with the proxy 106 to perform its functions. To the mobile device 104, the proxy 106 can appear identical to the business system 102 or a portion of the application program 108.

The business system proxy can be installed in any of multiple ways. In some implementations the business system 102 is installed on the laptop device 118 to form the proxy 106, in analogy with how the actual business system 102 was installed. One or more components of the business system that are not relevant for the operation of the mobile device can be eliminated or omitted in the installation. For example, if the mobile operation focuses on SCM functionality, one or more other aspects of ERP functionality can be excluded from the proxy 106. As another example, the business system 102 can be copied to the laptop device 118 to form the proxy 106. Similarly, one or more unnecessary components can be omitted or removed in the copy.

The business system 102 needs to coordinate with the business system proxy 106, for example to make relevant data available in the remote location and to ensure data consistency. A replication and/or synchronization can be performed between the business system 102 and the proxy 106. In some implementations, this replication/synchronization is performed with the proxy so that no replication/synchronization need be performed between the business system 102 and the mobile device 104. This can have advantages because a replication/synchronization with the mobile device would be dependent on the particular type of mobile device used, on the operating system run on the device, and on the particular client software operated on the device. In other words, replication/synchronization with the mobile device usually increases development and/or maintenance costs for the manufacturer or owner of the business system 102, because of the complex middleware required to connect very different systems, mobile device and a business system.

Here, the coordination can be performed by a replication/synchronization component 120 in the business system 102. In some implementations, the component 120 can determine a state of the business system 102 and a state of the business system proxy 106, compare the two states, and perform one or more replication/synchronization operations accordingly. For example, if data in the proxy 106 is found to be outdated vis-á-vis the corresponding aspect of the business system 102, or vice versa, the component can update the data. Replication/synchronization can be performed in one direction or in more than one direction as needed. Replication/synchronization between business system and a business system proxy requires less efforts and complexity than between a business system and mobile device, due to the fact that business system and business system proxy are not so different in platform, hardware and software stack as business system and mobile device.

Assume now that the truck 116 is driven to a remote location, for example to deliver goods according to an order. The operator can exit the truck at the remote location, perform the delivery, and enter a delivery confirmation into the mobile device. For example, the order can be identified in the visual interface 114 (e.g., "Order No. 10" is being delivered). The user can activate an input control 122, such as by clicking a button or link on the visual interface 114, to confirm that the delivery has been made.

The visual interface 114 can be generated using a browser application such as Microsoft Internet Explorer on the mobile device 104. In some implementations, the visual interface 114 is configured so that no business logic is stored on the mobile device; rather, the mobile device must be in online communication with the logical functionality 110 for the particular operation (e.g., an SCM function) to be performed. Here, the mobile device 104 can be in continuous communication with the laptop device 118, for example using a wireless communication device 124 in the laptop, such as a wireless network card. Any kind of wireless communication can be used between the mobile device and the business system proxy 106. One advantage with the exemplary implementation is that the truck 116 need not engage in long distance communication with the business system 102 while at the remote location, which can reduce the need for communication equipment in the truck.

The user's activation of the input control 122 can trigger the mobile device 104 to generate a call to the business proxy 106. In some implementations, the call is generated by the mobile device executing script code, such as Javascript, that is directed to the logical functionality 110. For example, the call can include a message that identifies a particular order and verifies that it has been delivered. After receiving the call, the proxy 106 can store corresponding information regarding the operation at the remote location. For example, status information regarding the order can be updated to reflect a date and time when it was delivered. An advantage of the exemplary implementation is that data can be stored on the proxy 106 and not on the mobile device, which may be more susceptible to failure or loss due to its size or use in the field.

At some time after the operation at the remote location, the truck 116 can return to a point nearer the business system 102. Then, the replication/synchronization component 120 can perform replication/synchronization as necessary. For example, the update that the goods were delivered can now be shared with the business system 102. As another example, the proxy 106 may receive data from the business system 102 that was not available at the most recent replication/synchronization.

In some implementations, the mobile device 104 can be configured to also engage in direct communication with the business system 102, at least when so permitted by the circumstances. For example, the mobile device 104 can include UMTS and/or GSM functionality that allows the visual interface 114 to generate the call directly to the application program 108 in the business system 102. At the remote location(s), however, the other network (such as UMTS/GSM) may not be available and the mobile device therefore cannot directly communicate with the business system at that location. However, by engaging in local communication with the proxy 106, which may appear identical to the business system 102, the mobile device can perform its ERP operations also when outside the reach of the network.

When the mobile device again comes into the coverage area of the UTMS/GSM network, a smooth migration from local proxy communication to direct communication with the business system can be performed. For example, upon the network becoming available, the mobile device can switch from communicating with the laptop device to instead communicate with the business system 102. In some implementations, the proxy 106 can verify whether replication/synchronization should be performed first, for example so that the mobile device's direct communication with the business system 102 does not risk data loss or introduce inconsistent data.

Figure 2:
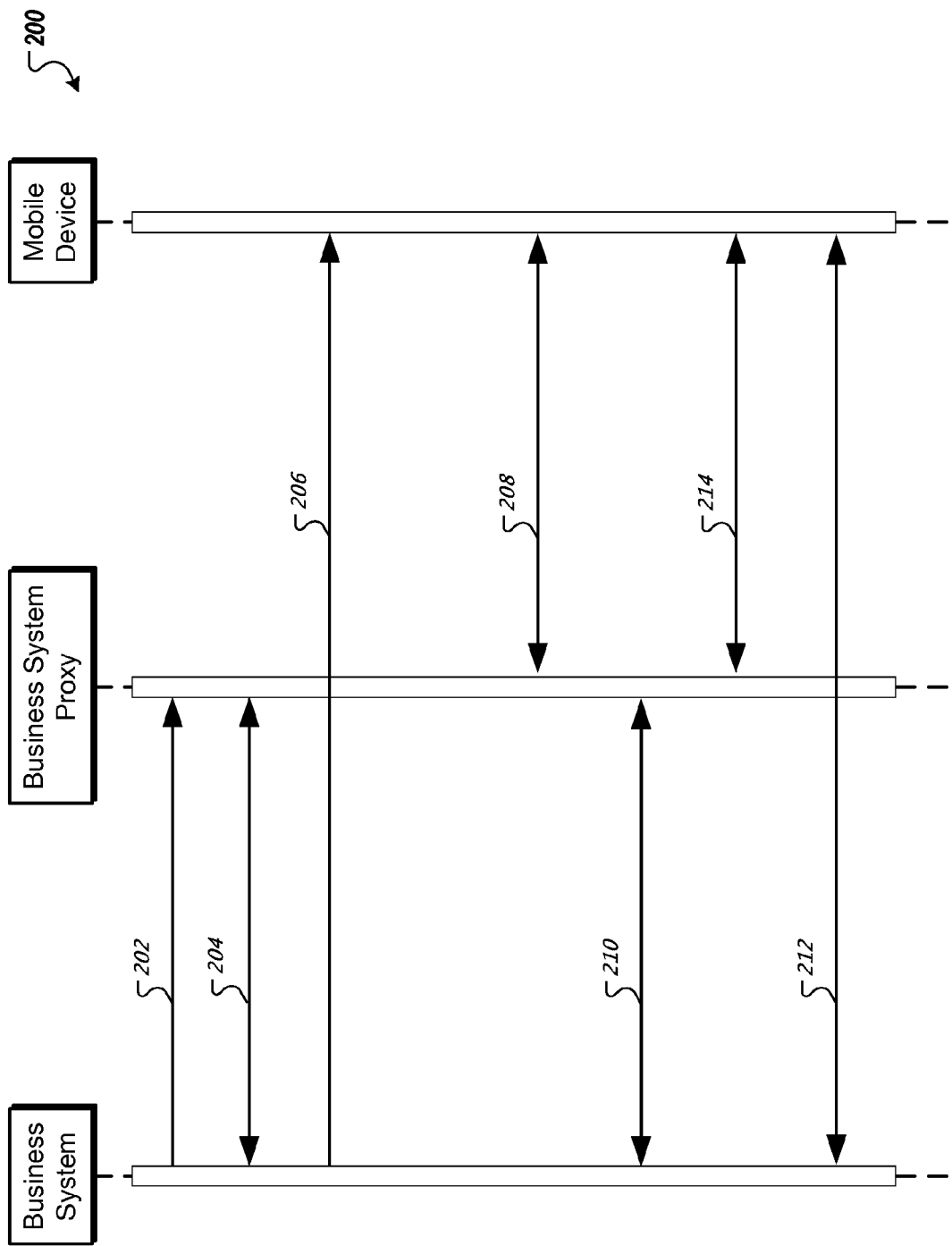
FIG. 2 shows a flow diagram of exemplary operations that can be performed by components shown in FIG. 1.

FIG. 2 shows a flow diagram of exemplary operations 200 that can be performed by components shown in FIG. 1. For example, the business system, business system proxy and mobile device engaged in the operations 200 can be those included in the system 100. Here, the business system proxy can be stored on a computer device in operation 202. For example, the business system 102 can install, and/or copy, the proxy 106 onto the laptop device 118. A replication/synchronization between the business system and business system proxy can be performed in operation 204, for example while the truck 116 is near the business system 102.

A visual interface can be forwarded to the mobile device in operation 206. For example, the visual interface generator 112 can process a screen of the application program 108 and generate a mobile screen that operates in a browser on the mobile device. The visual interface can be stored on the mobile device, for example using markup code and/or script code.

The mobile device can engage in local communication with the business system proxy in operation 208. For example, at the remote location a local wireless network can be initiated using the wireless communication device 124. This can allow the operator to use one or more features provided by the logical functionality 110, such as to perform an SCM operation or another ERP function.

The business system proxy can replicate and/or synchronize with the business system in operation 210. For example, the replication/synchronization component 120 can be activated when the truck 116 returns from the remote location.

In some implementations, the mobile device can engage in direct communication with the business system as network circumstances permit, in operation 212. For example, it can be determined in operation 214 that the business system proxy has forwarded earlier generated updates by the mobile device to the business system, and that it is now safe for the mobile device to directly communicate with the business system.

In some implementations, more or fewer operations can be performed. As another example, one or more operations can be performed in another order.

Figure 3:
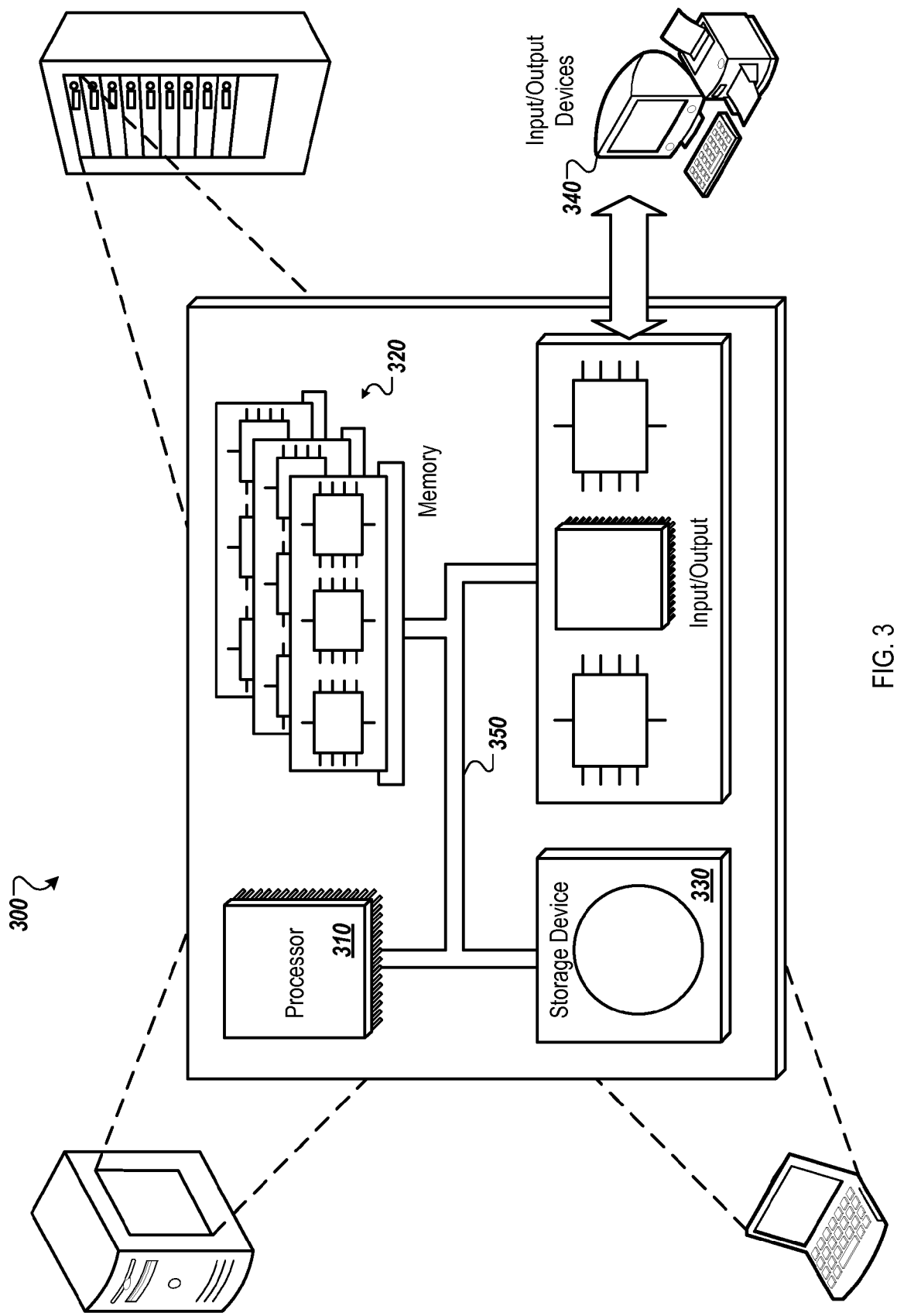
FIG. 3 is a block diagram of a computing system that can be used in connection with computer-implemented methods described in this document.

FIG. 3 is a schematic diagram of a generic computer system 300. The system 300 can be used for the operations described in association with any of the computer-implement methods described previously, according to one implementation. The system 300 includes a processor 310, a memory 320, a storage device 330, and an input/output device 340. Each of the components 310, 320, 330, and 340 are interconnected using a system bus 350. The processor 310 is capable of processing instructions for execution within the system 300. In one implementation, the processor 310 is a single-threaded processor. In another implementation, the processor 310 is a multi-threaded processor. The processor 310 is capable of processing instructions stored in the memory 320 or on the storage device 330 to display graphical information for a user interface on the input/output device 340.

The memory 320 stores information within the system 300. In one implementation, the memory 320 is a computer-readable medium. In one implementation, the memory 320 is a volatile memory unit. In another implementation, the memory 320 is a non-volatile memory unit.

The storage device 330 is capable of providing mass storage for the system 300. In one implementation, the storage device 330 is a computer-readable medium. In various different implementations, the storage device 330 may be a floppy disk device, a hard disk device, an optical disk device, or a tape device.

The input/output device 340 provides input/output operations for the system 300. In one implementation, the input/output device 340 includes a keyboard and/or pointing device. In another implementation, the input/output device 340 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments have been described. Nevertheless, it will be understood that various modifications may be made without departing from the spirit and scope of this disclosure. Accordingly, other embodiments are within the scope of the following claims.

What is claimed is:

1. A computer program product tangibly embodied in a non-transitory computer-readable storage medium and comprising instructions that when executed by a processor perform a method for interaction between a plurality of networked computing devices, the method comprising:

receiving, at a mobile device from a business system that includes an application program having logical functionality, a visual interface for storage on the mobile device and display by a browser on the mobile device, the visual interface configured for communicating with the logical functionality;

sending, from the mobile device to a system proxy device, a first call including data corresponding to a first physical operation performed at a first remote location, the first call being generated using the visual interface and received on the system proxy device by a business system proxy that includes the logical functionality, wherein the business system proxy: (i) exhibits the logical functionality to the mobile device and thereby ensures that the visual interface is operable, (ii) acts as a local proxy for the business system in receiving and handling calls, and (iii) participates in a replication and synchronization of the data with the business system, the replication and synchronization being independent of a type of the mobile device; and sending, from the mobile device to the business system, a second call including data corresponding to a second physical operation performed at a second remote location, the second call being received by the application program having the logical functionality;

wherein the replication and synchronization is performed between the business system and the system proxy device, and not directly between the business system and the mobile device.

2. The computer program product of claim 1, further comprising:
performing a replication or synchronization of the business system proxy with the business system before the business system proxy and the mobile device engage in the communication, wherein the mobile device uses the replication or synchronization in the communication with the business system proxy.

3. The computer program product of claim 1, further comprising:
installing at least one and fewer than all components of the business system on the system proxy device.

4. The computer program product of claim 3, wherein the business system proxy appears identical to the business system relative to the mobile device.

5. The computer program product of claim 1, wherein the system proxy device is located in a vehicle transporting an operator of the mobile device to the first remote location, and wherein the system proxy device engages in local wireless communication with the mobile device during use of the mobile device at the first remote location.

6. The computer program product of claim 1, further comprising:
generating the visual interface in the business system from the application program, the visual interface generated using markup language code.

7. The computer program product of claim 1, wherein the visual interface is configured so that the mobile device generates the call to the business system proxy by executing script code in the visual interface.

8. The computer program product of claim 1, wherein the visual interface is configured so that the mobile device can migrate into direct communication with the business system other than using the business system proxy as permitted by communication conditions.

9. A computer program product tangibly embodied in a non-transitory computer-readable storage medium and comprising instructions that when executed by a processor perform a method for interaction between a plurality of networked computing devices, the method comprising:
receiving, at a mobile device, a visual interface for storing on the mobile device and display by a browser on mobile device, the visual interface received from a business system that includes an application program having logical functionality, the visual interface configured for communicating with the logical functionality;

sending, from the mobile device to a system proxy device, a first call including data corresponding to a first physical operation performed at a first remote location, the first call being generated using the visual interface and received on the system proxy device by a business system proxy that includes the logical functionality, wherein the business system proxy: (i) exhibits the logical functionality to the mobile device and thereby ensures that the visual interface is operable, (ii) acts as a local proxy for the business system in receiving and handling calls, and (iii) participates in a replication and synchronization of the data with the business system, the replication and synchronization being independent of a type of the mobile device; and sending, from the mobile device to the business system, a second call including data corresponding to a second physical operation performed at a second remote location, the second call being received by the application program having the logical functionality;

wherein the replication and synchronization is performed between the business system and the system proxy device, and not directly between the business system and the mobile device.

10. The computer program product of claim 9, wherein the system proxy device is located in a vehicle transporting an operator of the mobile device to the first remote location, and wherein the system proxy device engages in local wireless communication with the mobile device during use of the mobile device at the first remote location.

11. The computer program product of claim 9, wherein the visual interface is generated in the business system from the application program using markup language code.

12. The computer program product of claim 9, wherein generating the call comprises executing script code in the visual interface.

13. The computer program product of claim 9, further comprising:
migrating the mobile device into direct communication with the business system other than using the business system proxy as permitted by communication conditions.

14. The computer program product of claim 13, further comprising:
verifying, before migrating, with the business system proxy that the update has been forwarded.

15. A system comprising:
a mobile device having stored thereon a visual interface for display by a browser on the mobile device, the visual interface configured for communicating with logical functionality of an application program of a business system; and a business system proxy that includes the logical functionality of the application program and is stored on a system proxy device configured for communicating with the mobile device at a remote location, wherein the business system proxy: (i) exhibits the logical functionality to the mobile device and thereby ensures that the visual interface is operable, (ii) acts as a local proxy for the business system in receiving and handling calls, and (iii) participates in a replication and synchronization of the data with the business system, the replication and synchronization being independent of a type of the mobile device and being performed between the business system and the system proxy device, and not directly between the business system and the mobile device;

wherein the mobile device is at least configured to: (i) send to the system proxy device a first call including data corresponding to a first physical operation performed at a first remote location, the first call being generated using the visual interface and received on the system proxy device by the business system proxy, and (ii) send to the business system a second call including data corresponding to a second physical operation performed at a second remote location, the second call being received by the application program having the logical functionality.

16. The system of claim 15, wherein the business system proxy is stored on the system proxy device by:
  installing at least one and fewer than all components of the business system on the system proxy device.

17. The system of claim 16, wherein the business system proxy appears identical to the business system relative to the mobile device.

18. The system of claim 15, wherein the system proxy device is located in a vehicle transporting an operator of the mobile device to the first remote location, and wherein the system proxy device engages in local wireless communication with the mobile device during use of the mobile device at the first remote location.

* * * * *